(12) United States Patent
Jenkins et al.

(10) Patent No.: US 11,353,104 B2
(45) Date of Patent: Jun. 7, 2022

(54) CARRIER FOR A PLANETARY GEAR TRAIN

(71) Applicant: Caterpillar Inc., Peoria, IL (US)

(72) Inventors: Michael R. Jenkins, Monticello, IL (US); Matthew E. Giannis, Peoria, IL (US); Steven M. Cross, Normal, IL (US); Keith A. Kabrick, Harrison, TN (US); Kurt W. Riggenbach, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 33 days.

(21) Appl. No.: 17/093,344

(22) Filed: Nov. 9, 2020

(65) Prior Publication Data

US 2022/0145984 A1    May 12, 2022

(51) Int. Cl.

| | |
|---|---|
| *F16H 57/08* | (2006.01) |
| *F16H 57/00* | (2012.01) |
| *F16D 1/112* | (2006.01) |
| *B60K 17/04* | (2006.01) |
| *F16H 1/46* | (2006.01) |
| *B60P 1/04* | (2006.01) |

(52) U.S. Cl.
CPC ......... *F16H 57/082* (2013.01); *B60K 17/046* (2013.01); *F16D 1/112* (2013.01); *F16H 1/46* (2013.01); *F16H 57/0025* (2013.01); *B60P 1/04* (2013.01)

(58) Field of Classification Search
CPC ...... F16H 57/082; F16H 1/46; F16H 57/0025; B60K 17/046; F16D 1/112
See application file for complete search history.

(56) References Cited

U.S. PATENT DOCUMENTS

| | | | |
|---|---|---|---|
| 6,148,941 A | 11/2000 | Hinton et al. | |
| 6,588,538 B2 | 7/2003 | Hinton et al. | |
| 6,645,107 B2 | 11/2003 | Fukuda | |
| 8,128,524 B2 | 3/2012 | Lasko et al. | |
| 8,323,143 B2 | 12/2012 | Schoon | |
| 8,562,472 B2 * | 10/2013 | Shinohara | B60K 17/046 |
| | | | 475/159 |
| 8,714,656 B2 * | 5/2014 | Shibukawa | F16D 1/108 |
| | | | 298/17 R |
| 8,769,819 B2 | 7/2014 | Paelicke et al. | |
| 2016/0025187 A1 | 1/2016 | Stoakes et al. | |
| 2017/0108099 A1 * | 4/2017 | Jensen | F16H 37/082 |

FOREIGN PATENT DOCUMENTS

JP          5361677 B2     9/2013

* cited by examiner

*Primary Examiner* — Derek D Knight
(74) *Attorney, Agent, or Firm* — Hibshman Claim Construction PLLC (57) ABSTRACT

A carrier for a planetary gear train includes a hub disposed about an axis of rotation, the hub having an external cylindrical surface including a plurality of splines extending along a longitudinal direction, the longitudinal direction being parallel to the axis of rotation; and a deck extending away from the hub along a radial direction, the radial direction being transverse to the longitudinal direction. The deck defining a plurality of holes therethrough, each hole of the plurality of holes being configured to receive an axle of a planet gear of the plurality of planet gears, the hub being disposed between the plurality of holes and the axis of rotation along the radial direction. The splines have a value of a parameter (P) that is not less than 2.5 and not greater than 6.0.

20 Claims, 7 Drawing Sheets

CARRIER FOR A PLANETARY GEAR TRAIN

TECHNICAL FIELD

The present disclosure relates generally to gear trains for transmission of shaft power and, more particularly, to splines for coupling a planet gear carrier to another gear in a truck final drive assembly.

BACKGROUND

Gear trains are known for transmission of mechanical shaft power, and for adjusting speed and/or torque attributes of shaft power transmitted therethrough. One example of a known gear train arrangement is a double-reduction planetary gear train, which has been used in the final drive assembly between a drive shaft and a wheel of a truck. A double-reduction planetary gear train may include a first planetary gear arrangement operatively coupled to a second planetary gear arrangement, where each of the first and second planetary gear arrangements includes a sun gear, a ring gear, and at least one planet gear.

Planet gears in a planetary gear arrangement may be directly coupled to a first gear through direct meshing of corresponding gear teeth, and indirectly coupled to a second gear through a carrier that supports the planet gears. Splined shaft connections have been used to directly couple a carrier-planet gear assembly to another component in a gear train.

U.S. Pat. No. 8,714,656 (hereinafter "the '656 patent"), entitled "Travel Drive Device for Dump Truck," purports to address the problem of increasing the strength of a spline in a travel drive device in response to demand to increase the load capacity of an existing truck. The '656 patent describes increasing an axial length of spline teeth as large as possible to achieve the desired improvement in spline strength. However, there are limits to spline lengths available to improve strength, while simultaneously meeting packaging and cost constraints. Accordingly, there is a need for improved spline connections in truck propulsion drive trains.

It will be appreciated that this background description has been created to aid the reader, and is not a concession that any of the indicated problems were themselves known previously in the art.

SUMMARY

In one aspect, the disclosure describes a carrier for mounting a plurality of planet gears in a planetary gear train. The carrier includes a hub disposed about an axis of rotation, the hub having an external cylindrical surface including a plurality of splines extending along a longitudinal direction, the longitudinal direction being parallel to the axis of rotation; and a deck extending away from the hub along a radial direction, the radial direction being transverse to the longitudinal direction. The deck defines a plurality of holes therethrough, each hole of the plurality of holes being configured to receive an axle of a planet gear of the plurality of planet gears. The hub is disposed between the plurality of holes and the axis of rotation along the radial direction. The splines have a value of a parameter (P) that is not less than 2.5 and not greater than 6.0. The parameter (P) is defined by $$P = 1.155 \cdot T + \frac{L_s \cdot D_b \cdot \sqrt{N}}{\left[D_r + \frac{(D_o - D_r)}{3}\right]^2}$$

wherein
T=a surface tensile strength of the plurality of splines, GPa;
$L_s$=an overall length of the plurality of splines along the longitudinal direction, mm;
$D_b$=a base diameter of the plurality of splines, mm;
N=a total number of splines in the plurality of splines;
$D_r$=a root diameter of the plurality of splines, mm; and
$D_o$=an outside diameter of the plurality of splines, mm.

In another aspect, the disclosure describes a final drive for a truck. The final drive includes a first planetary gear train including a first sun gear, a first ring gear, and a first plurality of planet gears mounted to a first carrier; and a second planetary gear train including a second sun gear, a second ring gear, and a second plurality of planet gears mounted to a second carrier. The first carrier includes a hub disposed about an axis of rotation, the hub having an external cylindrical surface including a plurality of splines extending along a longitudinal direction, the longitudinal direction being parallel to the axis of rotation, the splines of the first carrier being directly coupled with internal splines of the second sun gear, such that the first carrier and the second sun are fixed in rotation about the axis of rotation; and a deck extending away from the hub along a radial direction, the radial direction being transverse to the longitudinal direction, the deck defining a plurality of holes therethrough. Each planet gear of the first plurality of planet gears is mounted to a corresponding hole of the first carrier via an axle disposed through the corresponding hole, such that each planet gear of the first plurality of planet gears is free to spin relative to the first carrier about a corresponding axle. The splines have a parameter (P) value that is not less than 2.5 and not greater than 6.0. The parameter (P) is defined by $$P = 1.155 \cdot T + \frac{L_s \cdot D_b \cdot \sqrt{N}}{\left[D_r + \frac{(D_o - D_r)}{3}\right]^2}$$

wherein
T=a surface tensile strength of the plurality of splines, GPa;
$L_s$=an overall length of the plurality of splines along the longitudinal direction, mm;
$D_b$=a base diameter of the plurality of splines, mm;
N=a total number of splines in the plurality of splines;
$D_r$=a root diameter of the plurality of splines, mm; and
$D_o$=an outside diameter of the plurality of splines, mm.

In another aspect, the disclosure describes a mining truck. The mining truck includes a frame and a propulsion drive train coupled to the frame. The propulsion drive train includes a prime mover operatively coupled to a propulsion wheel via a final drive for transmission of mechanical shaft power therebetween. The final drive includes a first planetary gear train operatively coupled to the prime mover via a drive shaft, the first planetary gear train including a first sun gear, a first ring gear, and a first plurality of planet gears mounted to a first carrier; and a second planetary gear train including a second sun gear, a second ring gear, and a second plurality of planet gears mounted to a second carrier. The propulsion wheel is fixed in rotation to an output component of the second planetary gear train.

The first carrier including a hub disposed about an axis of rotation, the hub having an external cylindrical surface including a plurality of splines extending along a longitudinal direction, the longitudinal direction being parallel to the axis of rotation, the splines of the first carrier being directly coupled with internal splines of the second sun gear, such that the first carrier and the second sun are fixed in rotation about the axis of rotation; and a deck extending away from the hub along a radial direction, the radial direction being transverse to the longitudinal direction, the deck defining a plurality of holes therethrough. Each planet gear of the first plurality of planet gears is mounted to a corresponding hole of the first carrier via an axle disposed through the corresponding hole, such that each planet gear of the first plurality of planet gears is free to spin relative to the first carrier about a corresponding axle.

The outside diameter of the plurality of splines is not less than 250 mm and not greater than 259 mm, and the total number of splines is not less than 58 and not greater than 64. The splines have a parameter (P) value that is not less than 3.0 and not greater than 5.2. The parameter (P) is defined by $$P = 1.155 \cdot T + \frac{L_s \cdot D_b \cdot \sqrt{N}}{\left[D_r + \frac{(D_o - D_r)}{3}\right]^2}$$

wherein
T=a surface tensile strength of the plurality of splines, GPa;
$L_s$=an overall length of the plurality of splines along the longitudinal direction, mm;
$D_b$=a base diameter of the plurality of splines, mm;
N=a total number of splines in the plurality of splines;
$D_r$=a root diameter of the plurality of splines, mm; and
$D_o$=an outside diameter of the plurality of splines, mm.

DETAILED DESCRIPTION

Aspects of the disclosure will now be described in detail with reference to the drawings, wherein like reference numbers refer to like elements throughout, unless specified otherwise.

Figure 1:
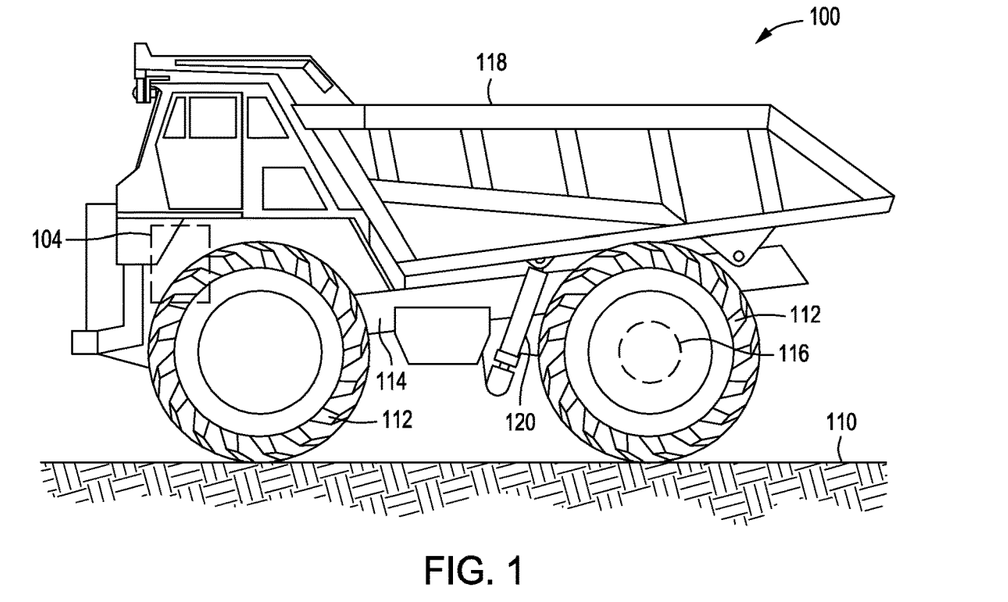
FIG. 1 is a side view of a machine, according to an aspect of the disclosure.

FIG. 1 illustrates a side view of a machine 100 powered by a prime mover 104 that is configured to convert stored energy to mechanical power. The prime mover 104 may be an internal combustion engine that is configured to convert chemical energy into mechanical power, an electric motor that is configured to convert electrical energy into mechanical power, combinations thereof, or any other prime mover known in the art. According to an aspect of the disclosure, the prime mover 104 does not include an internal combustion engine, and according to another aspect of the disclosure, the prime mover 104 does not include an electric motor.

The machine 100 can be an over-the-road vehicle, such as a truck used in transportation, or may be any other type of machine that performs an operation associated with an industry such as mining, construction, farming, transportation, forestry, or any other industry known in the art. For example, the machine may be an off-highway truck; an on-highway truck; a maritime machine; an earth-moving machine, such as a wheel loader, an excavator, a dump truck, a backhoe, or a motor grader; a material handler; a feller-buncher; or the like. The specific machine 100 illustrated in FIG. 1 is a dump truck having a material handling bed 118 that is operated by an actuator 120.

The machine 100 includes at least one propulsion device 112 that rotates or translates relative to a frame 114 of the machine 100 to propel the machine 100 over a work surface 110. The at least one propulsion device 112 may include a wheel, a continuous track assembly, combinations thereof, or any other ground propulsion device known in the art.

The propulsion device 112 may be operatively coupled to the prime mover 104 for transmission of shaft power therebetween, to achieve the propulsion function. Further, a final drive assembly 116 may be included in a propulsion power train between the prime mover 104 and the at least one propulsion device 112.

Figure 2:
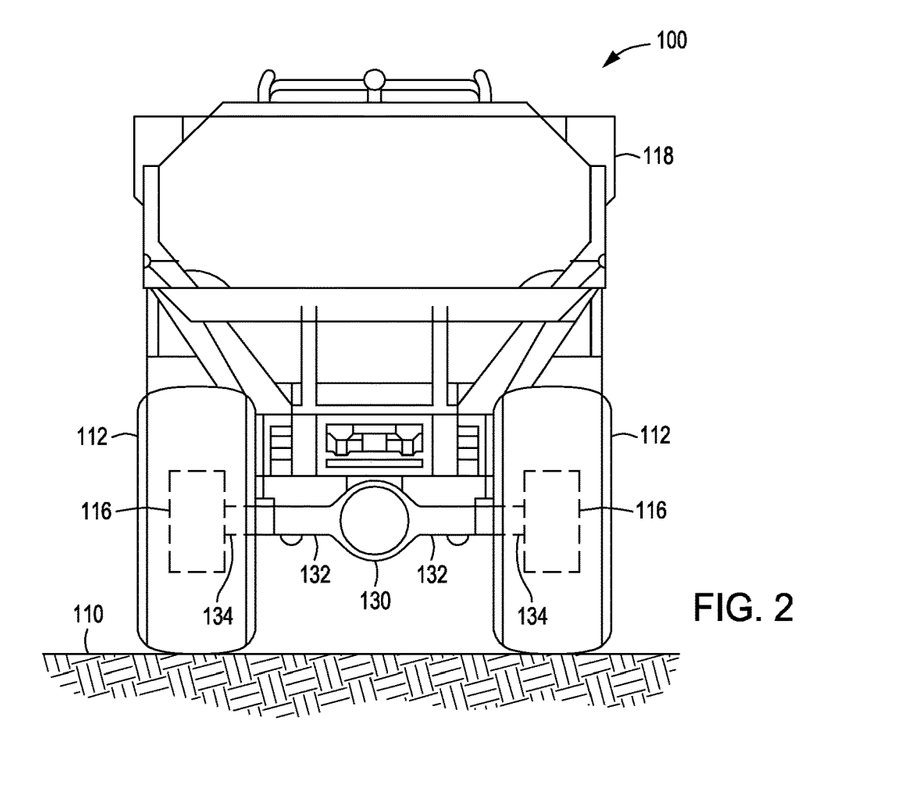
FIG. 2 is a rear view of a machine, according to an aspect of the disclosure.

FIG. 2 illustrates a rear view of a machine 100, according to an aspect of the disclosure. The final drive assembly 116 may be coupled to a differential 130 via an axle tube 132 and a spindle 134. Further, the axle tube 132 and the spindle 134 may enclose a drive shaft (not shown in FIG. 2) for transmitting mechanical shaft power between the differential 130 and the propulsion device 112 via the final drive assembly 116. The spindle 134 may be fixed to the axle tube 132, such that the spindle 134 does not rotate relative to the axle tube 132. Further, some portions of the final drive assembly 116 may be fixed to the spindle 134 such that those portions do not rotate relative to the spindle 134, while other portions of the final drive assembly that are directly or indirectly coupled to the propulsion device 112 are free to rotate relative to the spindle 134. Portions of the final drive assembly 116 may be fixed to the spindle via a reaction hub coupled therebetween.

It will be appreciated that the differential 130 and the axle tube 132 illustrated in FIG. 2 are non-limiting examples, and could be replaced with other arrangements known in the art, such as an electrical motor having a stator and/or housing fixed to the spindle 134 and an output rotor shaft operatively coupled to the final drive assembly 116 for transmission of mechanical shaft power therebetween.

Figure 3:
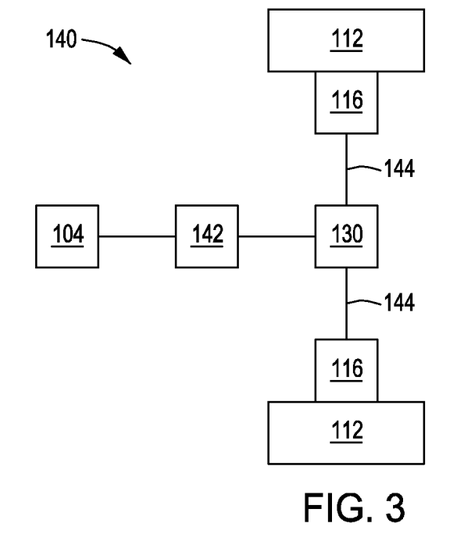
FIG. 3 is a schematic view of a propulsion power train, according to an aspect of the disclosure.

FIG. 3 illustrates a schematic view of a propulsion power train 140, according to an aspect of the disclosure. In the propulsion power train 140, an input to the differential 130 is operatively coupled to the prime mover 104 via a transmission gear box 142 for transmission of mechanical shaft power therebetween. Further, each propulsion device 112 is operatively coupled to an output of the differential 130 via a drive shaft 144 and a final drive assembly 116 for transmission of mechanical shaft power therebetween. Accordingly, each propulsion device 112 may receive mechanical shaft power from the prime mover 104 via the propulsion power train 140.

According to an aspect of the disclosure, the final drive assembly 116 is a speed reduction gear train such that a rotational speed of the propulsion device 112 is less than a rotational speed of the drive shaft 144 by operation of the final drive assembly 116. In turn, the final drive assembly may not include speed increasing gear trains.

Figure 4:
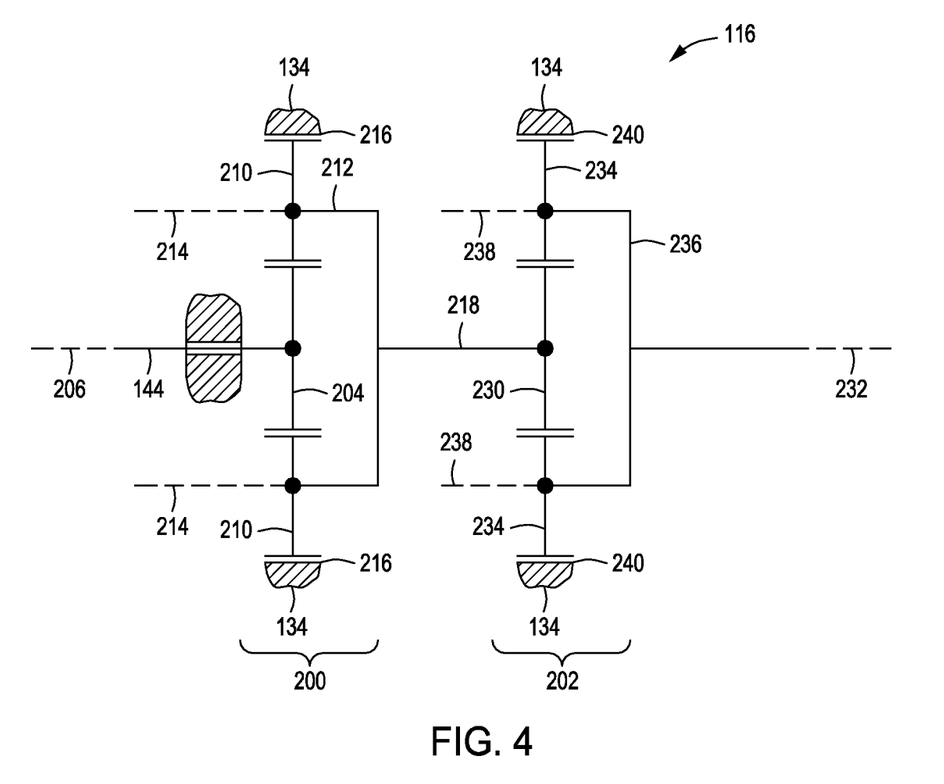
FIG. 4 is a schematic view of a final drive, according to an aspect of the disclosure.
Figure 5:
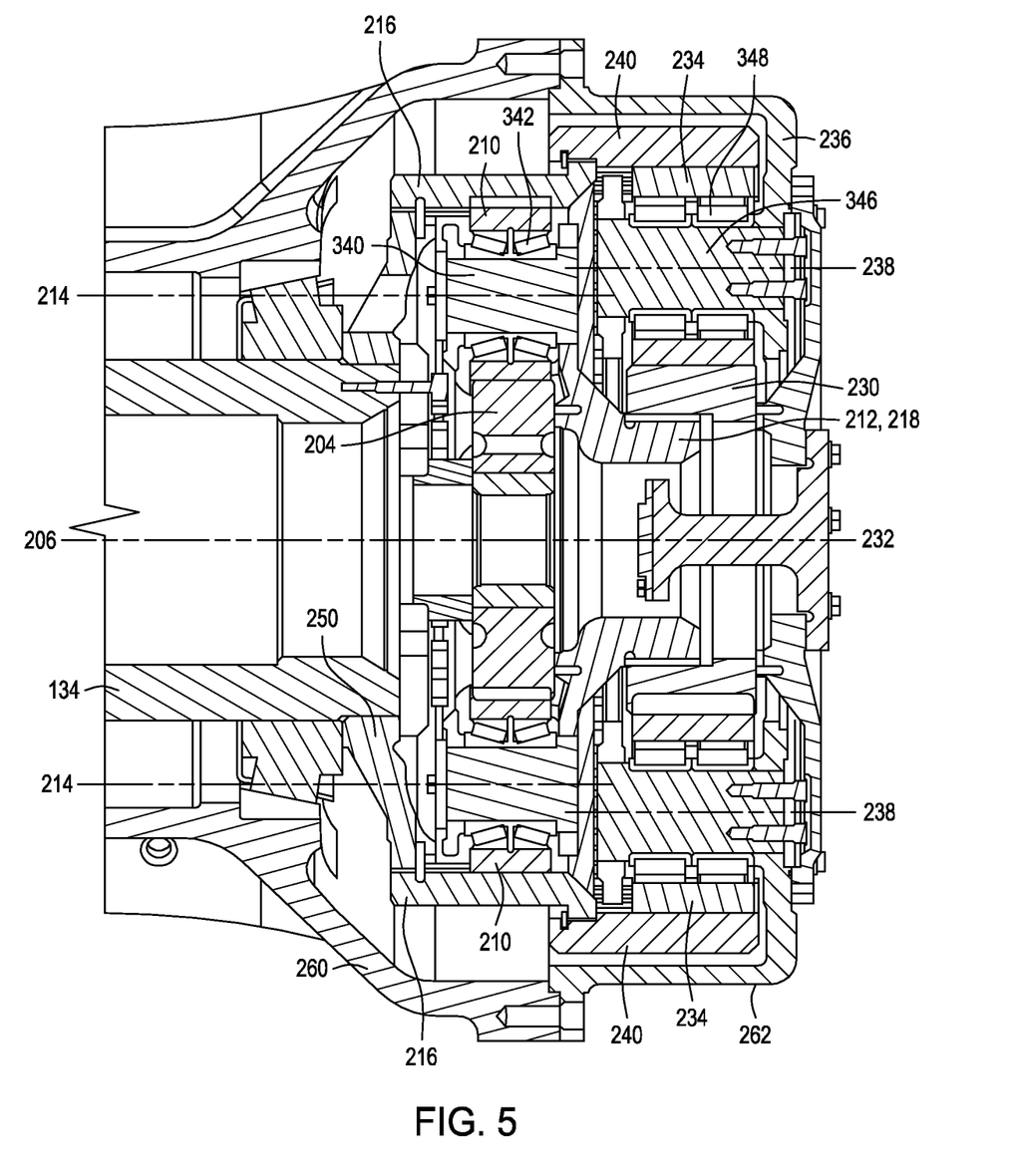
FIG. 5 is a cross-sectional view of a final drive, according to an aspect of the disclosure.
Figure 6:
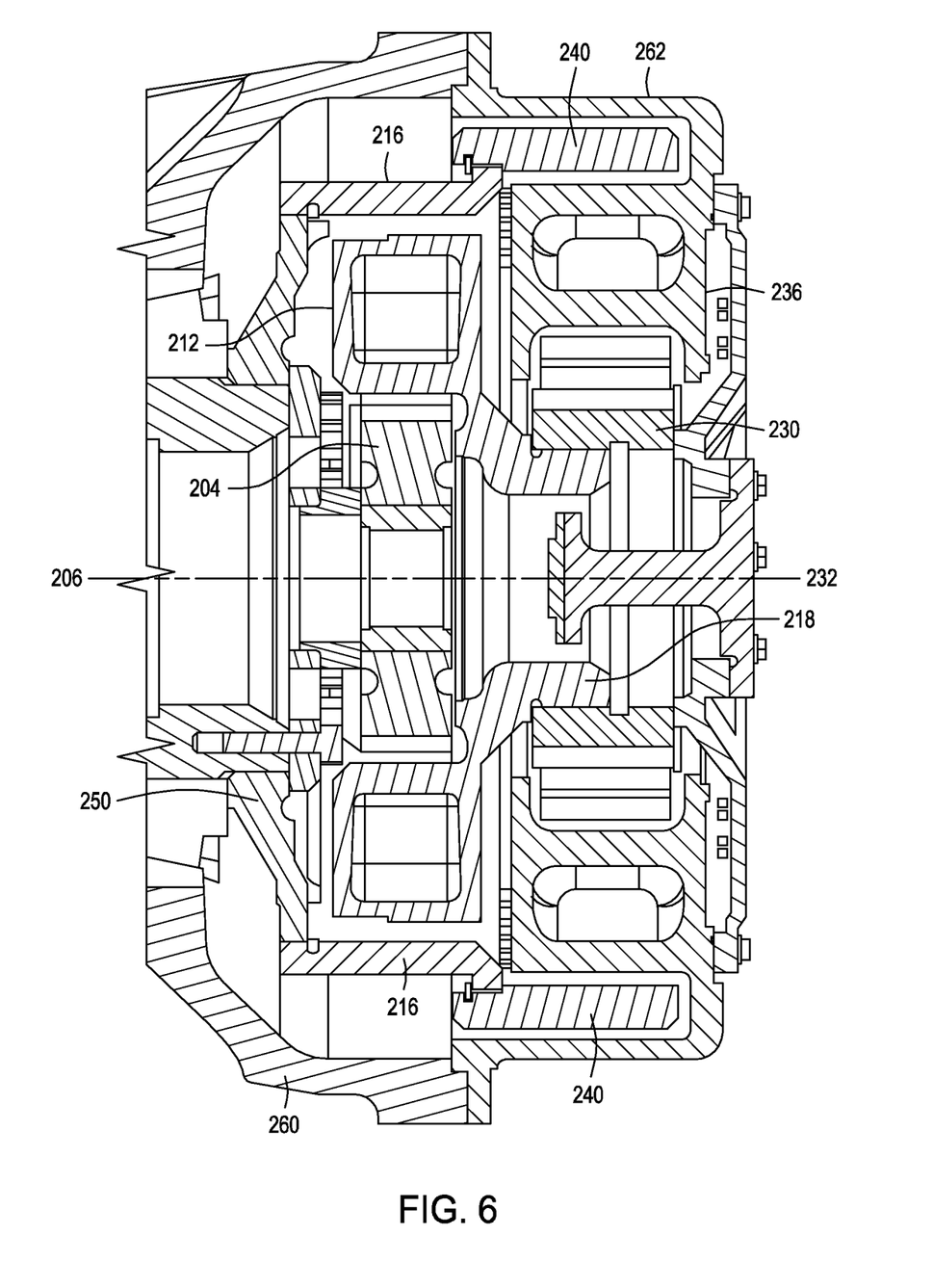
FIG. 6 is a cross-sectional view of a final drive, according to an aspect of the disclosure.

Referring now to FIGS. 4-6, FIG. 4 illustrates a schematic view of a final drive assembly 116, according to an aspect of the disclosure; FIG. 5 illustrates a cross-sectional view of a final drive assembly 116, according to an aspect of the disclosure; and FIG. 6 illustrates a cross-sectional view of a final drive assembly 116, according to an aspect of the disclosure. The final drive assembly 116 may include a double-reduction planetary gear train, including a first stage planetary gear train 200 and a second stage planetary gear train 202 that is operatively coupled to the first stage planetary gear train 200.

A first stage sun gear 204 of the first stage planetary gear train 200 may receive mechanical shaft power from the drive shaft 144 through direct or indirect coupling of the drive shaft 144 with the first stage sun gear 204. For example, the first stage sun gear 204 may be directly coupled to the drive shaft 144 via a spline connection, an interference fit, a welded connection, a keyed connection, combinations thereof, or any other arrangement known in the art for coupling a gear to a shaft. As a result, the drive shaft 144 and the first stage sun gear 204 may be fixed in rotation about a first rotational axis 206.

The first stage sun gear 204 may be directly coupled to one or more first stage planet gears 210, for example through intermeshing of gear teeth of the first stage sun gear 204 with gear teeth of the one or more first stage planet gears 210, for transmission of mechanical shaft power therebetween. Further, the first stage planet gears 210 may be mounted on a first stage carrier 212, such that each first stage planet gear 210 is free to rotate about its own second axis 214 that defines an axis of rotation of each first stage planet gear 210 relative to the first stage carrier 212.

Each first stage planet gear 210 may be further directly coupled to a first stage ring gear 216, for example through intermeshing of gear teeth of each first stage planet gear 210 with gear teeth of the first stage ring gear 216, for transmission of mechanical shaft power therebetween. According to an aspect of the disclosure, the first stage ring gear 216 may be mechanically grounded to the spindle 134, such that the first stage ring gear 216 is fixed in rotation with the spindle 134. The first stage ring gear 216 may be mechanically grounded to the spindle 134 via a reaction hub 250 coupled therebetween.

The mechanical grounding of the first stage ring gear 216 to the spindle 134 may be achieved by directly coupling the first stage ring gear 216 in contact with the spindle 134 through a bolted connection, a welded connection, a splined connection, an interference connection, combinations thereof, or any other suitable connection known in the art. Alternatively, the first stage ring gear 216 may be indirectly coupled to the spindle 134 via an intermediate structure that is fixed to both the first stage ring gear 216 and the spindle 134, such as the reaction hub 250.

Consequently, the first stage carrier 212 may rotate about the first rotational axis 206 while each first stage planet gear 210 rotates relative to the first stage carrier 212 about its corresponding second axis 214. However, it will be appreciated that other arrangements of the first stage planetary gear train 200 are within the scope of the present disclosure. For example, the first stage ring gear 216 may be free to rotate about the first rotational axis 206 while one of the first stage sun gear 204 or the first stage carrier 212 is mechanically grounded to the spindle 134, or the first stage sun gear 204 may be fixed in rotation with the first stage carrier 212.

A second stage sun gear 230 of the second stage planetary gear train 202 may receive mechanical shaft power from a hub 218 of the first stage carrier 212 through direct coupling of the hub 218 with the second stage sun gear 230. For example, the second stage sun gear 230 may be directly coupled to hub 218 of the first stage carrier 212 via a spline connection. As a result, the first stage carrier 212 and the second stage sun gear 230 may be fixed in rotation about a third rotational axis 232. According to an aspect of the disclosure, the third rotational axis 232 may be coaxial with the first rotational axis 206.

The second stage sun gear 230 may be directly coupled to one or more second stage planet gears 234, for example through intermeshing of gear teeth of the second stage sun gear 230 with gear teeth of the one or more second stage planet gears 234, for transmission of mechanical shaft power therebetween. Further, the second stage planet gears 234 may be mounted on a second stage carrier 236 such that each second stage planet gear 234 is free to rotate about its own fourth axis 238 that defines an axis of rotation of each second stage planet gear 234 relative to the second stage carrier 236.

Each second stage planet gear 234 may be further directly coupled to a second stage ring gear 240, for example through intermeshing of gear teeth of each second stage planet gear 234 with gear teeth of the second stage ring gear 240, for transmission of mechanical shaft power therebetween. According to an aspect of the disclosure, the second stage ring gear 240 may be mechanically grounded to the spindle 134, such that the second stage ring gear 240 is fixed in rotation with the spindle 134. The second stage ring gear 240 may be mechanically grounded to the spindle 134 via a reaction hub 250 coupled therebetween.

The mechanical grounding of the second stage ring gear 240 to the spindle 134 may be achieved by directly coupling the second stage ring gear 240 in contact with the spindle 134 through a bolted connection, a welded connection, a splined connection, an interference connection, combinations thereof, or any other suitable connection known in the art. Alternatively, the second stage ring gear 240 may be indirectly coupled to the spindle 134 via an intermediate structure that is fixed to both the second stage ring gear 240 and the spindle 134, such as the reaction hub 250.

Consequently, the second stage carrier 236 may rotate about the third rotational axis 232 while each second stage planet gear 234 rotates relative to the second stage carrier 236 about its corresponding fourth axis 238. In turn, a propulsion device 112 may be directly or indirectly coupled to the second stage carrier 236 to drive rotation of the propulsion device 112 about the third rotational axis 232, relative to the spindle 134.

However, it will be appreciated that other arrangements of the second stage planetary gear train 202 are within the scope of the present disclosure. For example, the second stage ring gear 240 may be free to rotate about the third rotational axis 232 while one of the second stage sun gear 230 or the second stage carrier 236 is mechanically grounded to the spindle 134, or the second stage sun gear 230 may be fixed in rotation with the second stage carrier 236.

The cutting plane for the cross section illustrated in FIG. 6 is a plane that includes the first rotational axis 206 and the third rotational axis 232, and that cuts through the first stage carrier 212 and the second stage carrier 236, but does not cut through any of the first stage planet gears 210 or the second stage planet gears 234. The cutting plane for the cross section illustrated in FIG. 5 is a plane that includes the first rotational axis 206, the third rotational axis 232, second axes 214 for two first stage planet gears 210 disposed on opposite sides of the first stage carrier 212, and fourth axes 238 for two second stage planet gears 234 disposed on opposite sides of the second stage carrier 236. Accordingly, in the non-limiting aspects illustrated in FIGS. 5 and 6, the first rotational axis 206 is coaxial with the third rotational axis 232.

Referring to FIGS. 5 and 6, the propulsion device 112 may include a wheel rim 260 that is configured to receive a tire and hold the tire fixed in rotation with the wheel rim 260 for propulsive engagement with the work surface 110. The wheel rim 260 may be fixed to the second stage carrier 236 via an output hub 262, such that the wheel rim 260, the output hub 262, and the second stage carrier 236 are all fixed in rotation about the third rotational axis 232. The output hub 262 may be integrated with the second stage carrier 236 as a one-piece assembly, or the output hub 262 may be a separate part that is fastened to the second stage carrier 236 by any appropriate fastening means known in the art. The output hub 262 may be fastened to the wheel rim 260 by bolts, rivets, welds, combinations thereof, or any other suitable fastening means known in the art.

Figure 7:
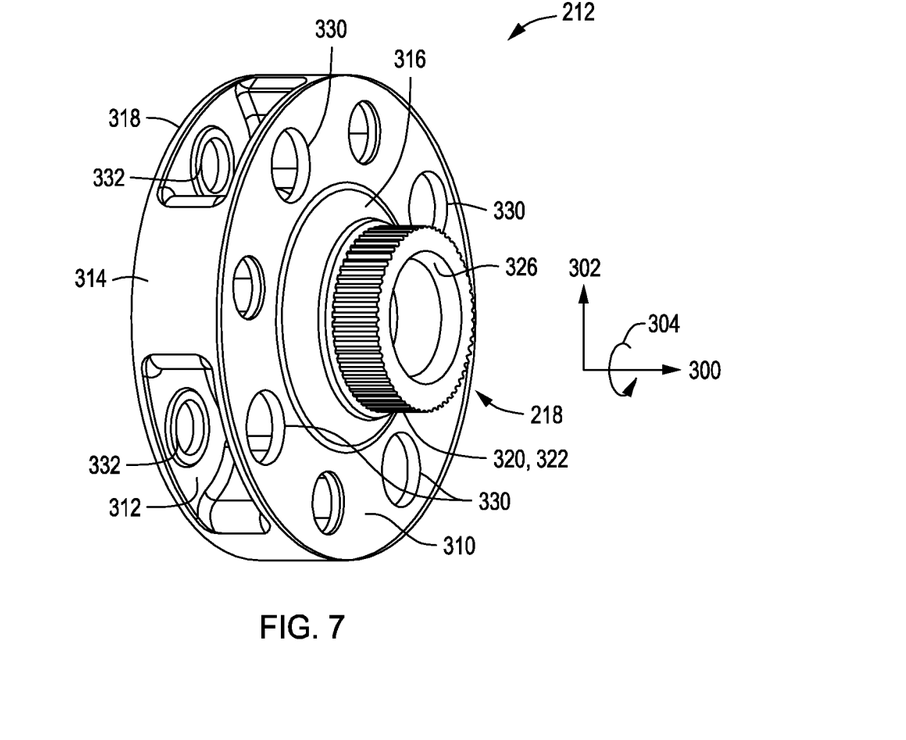
FIG. 7 is a perspective view of a carrier, according to an aspect of the disclosure.
Figure 8:
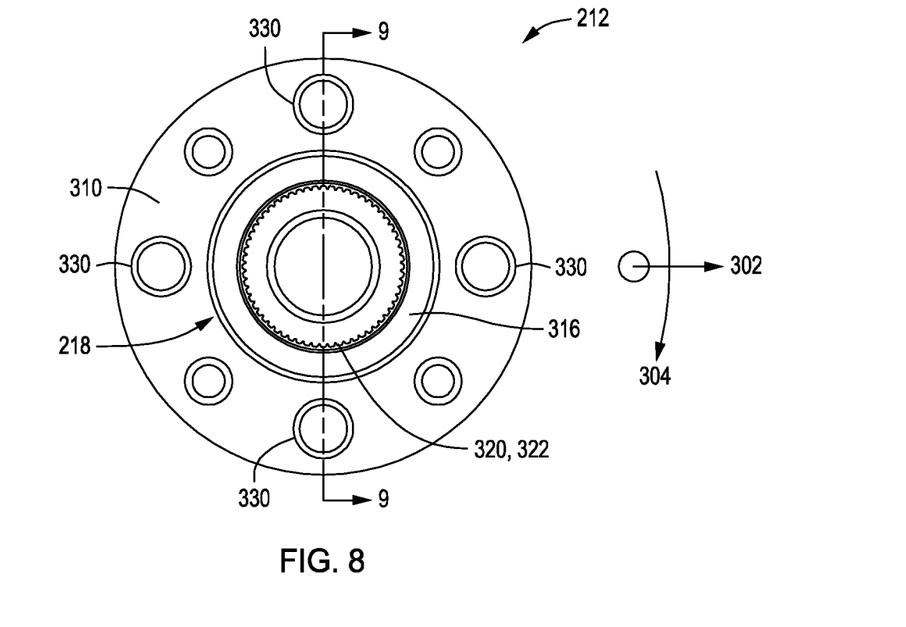
FIG. 8 is a plan view of a carrier, according to an aspect of the disclosure.
Figure 9:
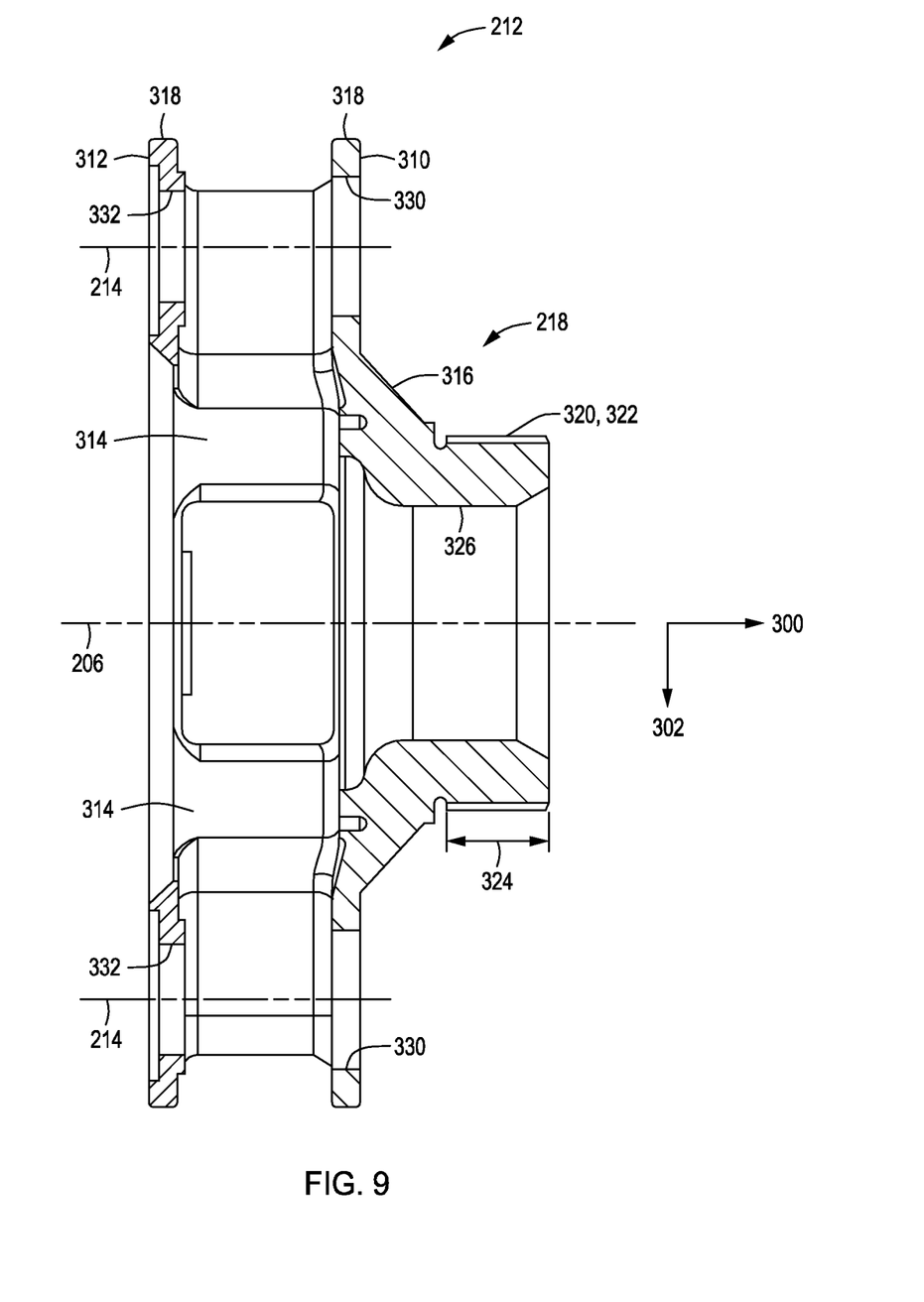
FIG. 9 is a cross-sectional view of a carrier, according to an aspect of the disclosure.

Referring to FIGS. 7-9, FIG. 7 is a perspective view of a first stage carrier 212, according to an aspect of the disclosure; FIG. 8 is a plan view of a first stage carrier 212, according to an aspect of the disclosure; and FIG. 9 is a cross-sectional view of a first stage carrier 212, according to an aspect of the disclosure. In each of FIGS. 7-9, an axial direction 300 extends parallel to the first rotational axis 206; a radial direction 302 extends transverse to the axial direction 300; and a circumferential direction 304 extends circumferentially about the axial direction 300. The cutting plane for FIG. 9 is section line 9-9 as illustrated in FIG. 8, which passes through the first rotational axis 206 along the radial direction 302.

The first stage carrier 212 may include a hub 218, and a first deck 310 extending away from the hub 218 along the radial direction 302. The first stage carrier 212 may further include a second deck 312 spaced apart from the first deck 310 along the axial direction 300, and extending away from the hub 218 along the radial direction 302. The first deck 310 may be fixed to the second deck 312 by one or more webbings 314 extending along the axial direction 300. The first deck 310 may be located between the second deck 312 and the hub 218 along the axial direction 300. An outer peripheral surface 318 of one or both of the first deck 310 and the second deck 312 may be a circular cylindrical surface extending about the first rotational axis 206 about the circumferential direction 304 and extending along the axial direction.

The hub 218 has an external surface 316 extending about the first rotational axis 206 along the circumferential direction 304. The external surface 316 may include a cylindrical surface 320 defining a plurality of splines 322. Each spline 322 extends along the axial direction 300, and adjacent splines 322 are distributed about the hub 218 along the circumferential direction 304. The plurality of splines 322 may be distributed uniformly about the circumferential direction 304, such that a distance between adjacent splines 322 is uniform throughout the plurality of splines 322, within applicable manufacturing tolerances. Further, the plurality of splines 322 may have an overall length 324 (see FIG. 9) extending along the axial direction 300. Each spline of the plurality of splines 322 may have the same nominal overall length 324, within applicable manufacturing tolerances.

According to an aspect of the disclosure, a total number of splines in the plurality of splines 322 advantageously ranges from 58 to 64. According to another aspect of the disclosure, a total number of splines 322 equals 60. However, it will be appreciated that the plurality of splines 322 may include any number of splines to suit a particular application.

The hub 218 may also have an internal surface 326 extending about the first rotational axis 206 along the circumferential direction 304. The external surface 316 and the internal surface 326 may define a thickness of the hub 218 along the radial direction 302. Alternatively, the hub 218 may not have an internal surface 326, but instead extend solidly from the first rotational axis 206 to the external surface 316.

The first deck 310 may define a first plurality of holes 330 therethrough, and the second deck 312 may define a second plurality of holes 332 therethrough. Each hole of the first plurality of holes 330 and a corresponding hole from the second plurality of holes 332 may be centered on a second axis 214 that defines an axis of rotation for a planet gear mounted to the first stage carrier 212 via the corresponding holes, where each second axis 214 is parallel to the axial direction 300. As a result, each hole of the first plurality of holes 330 may directly face a corresponding hole of the second plurality of holes 332 along the axial direction 300.

A total number of holes in the first plurality of holes 330 may be equal to a total number of holes in the second plurality of holes 332, such that individual holes in the first plurality of holes 330 are uniquely paired with a corresponding hole in the second plurality of holes 332 along a corresponding second axis 214.

Referring to FIG. 5, each first stage planet gear 210 may be coupled to the first stage carrier 212 via an axle 340 that extends through corresponding holes of the first plurality of holes 330 and the second plurality of holes 332. Further each first stage planet gear 210 may rotatively engage each axle 340 via a bearing 342 disposed therebetween, such that each first stage planet gear 210 is free to rotate relative to its respective axle 340 about a corresponding second axis 214.

According to an aspect of the disclosure, the first stage planetary gear train 200 includes a total of four first stage planet gears 210. According to another aspect of the disclosure, the first stage planetary gear train 200 includes at least two first stage planet gears 210. However, it will be appreciated that the first stage planetary gear train 200 may include any number of first stage planet gears 210 to suit a particular application.

Each second stage planet gear 234 may be coupled to the second stage carrier 236 via an axle 346, and each second stage planet gear 234 may rotatively engage each axle 346 via a bearing 348 disposed therebetween. In turn, each second stage planet gear 234 is free to rotate relative to its respective axle 346 about a corresponding fourth axis 238.

Figure 10:
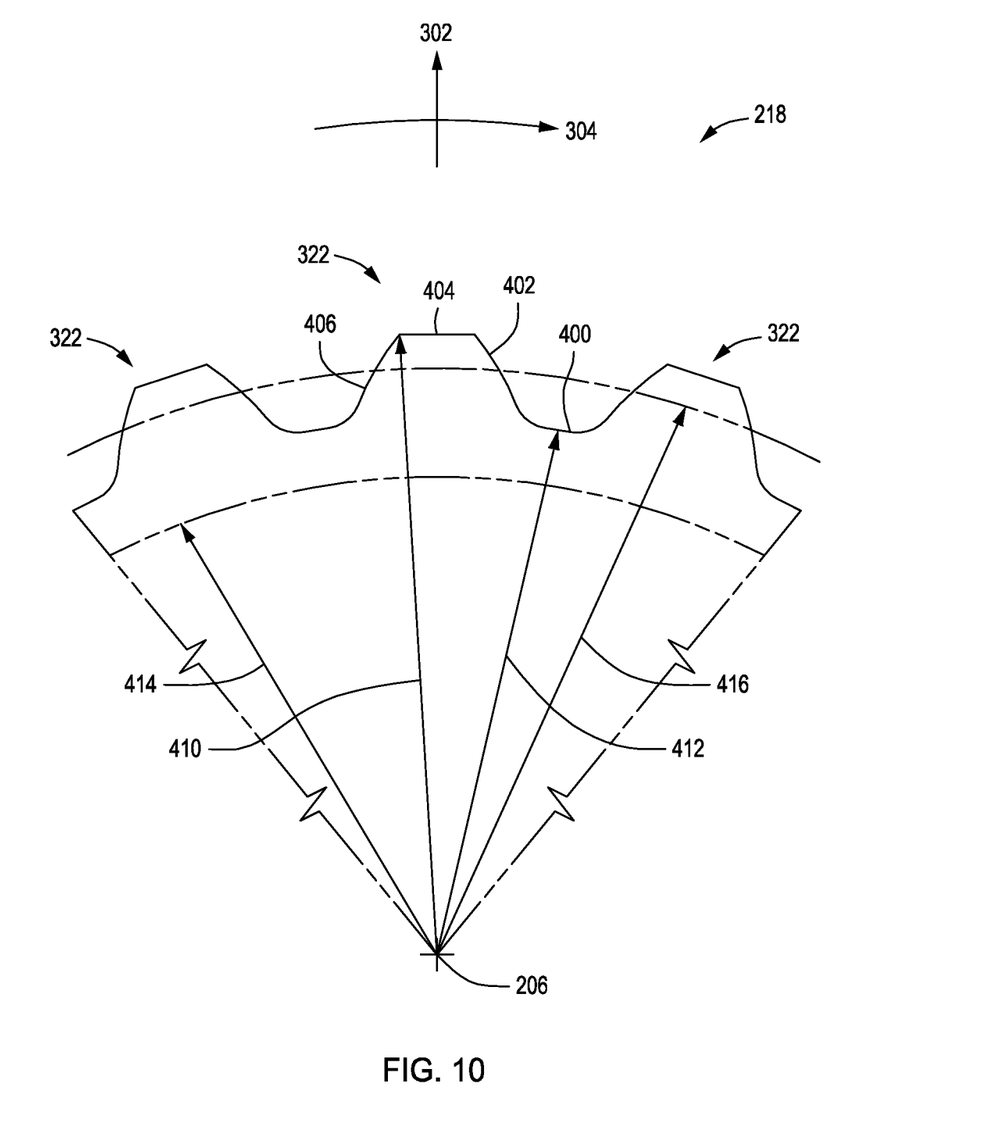
FIG. 10 is a plan view of splines on a hub, according to an aspect of the disclosure.

FIG. 10 is a plan view of splines 322 on a hub 218, according to an aspect of the disclosure. Each spline tooth 322 may be defined, at least in part, by a root surface 400, a first flank surface 402, a tip surface 404, and a second flank surface 406. According to an aspect of the disclosure, the first flank surface 402, the second flank surface 406, or both, may embody involute curves in a plane defined exclusively by the radial direction 302 and the circumferential direction 304. However, it will be appreciated that the first flank surface 402 and the second flank surface 406 may embody any profile to suit a particular application. Although FIG. 10 illustrates the tip surface 404 and the root surface 400 as including fillets, it will be appreciated that the tip surface 404, the root surface 400, or both, may be flat and without fillets.

The tip surface 404 may define an outside diameter 410 ($D_o$), and the root surface 400 may define a root diameter ($D_r$) 412. Although the outside diameter 410 and the root diameter 412 are dimensioned relative to the first rotational axis 206 in FIG. 10, apparently as radii, it will be appreciated that diameters may be defined as twice the apparent radii in FIG. 10. According to an aspect of the disclosure, the outside diameter 410 is the diameter of a circle that circumscribes the plurality of splines 322, within manufacturing tolerances, in a plane defined exclusively by the radial direction 302 and the circumferential direction 304. According to another aspect of the disclosure, the root diameter 412 may be the diameter of a circle that inscribes the root surfaces 400, within manufacturing tolerances, in a plane defined exclusively by the radial direction 302 and the circumferential direction 304.

For design and analysis of splines, it may be useful to define a base diameter 414 ($D_b$) in terms of a pitch diameter 416 ($D_p$) and a pressure angle ($\varphi$) according to Equation 1.

$$D_b = D_p \cdot \cos(\varphi) \quad \text{Equation 1}$$

Further, the pitch diameter, $D_p$, may be defined in terms of the total number of splines (N) and the module (M) of the splines according to Equation 2.

$$D_p = N \cdot M \quad \text{Equation 2}$$

The module (M) may be defined as the inverse of the spline pitch, (1/pitch).

Moreover, a parameter (P), according to Equation 3, may also be useful for design and analysis of splines.

$$P = 1.155 \cdot T + \frac{L_s \cdot D_b \cdot \sqrt{N}}{\left[D_r + \frac{(D_o - D_r)}{3}\right]^2} \quad \text{Equation 3}$$

where:
T=a surface tensile strength of the plurality of splines, Gigapascals (GPa);
$L_s$=an overall length of the plurality of splines along the longitudinal direction, Millimeters (mm);
$D_b$=a base diameter of the plurality of splines, mm;
N=a total number of splines in the plurality of splines;
$D_r$=a root diameter of the plurality of splines, mm; and
$D_o$=an outside diameter of the plurality of splines, mm.

The tensile strength of the plurality of splines may be evaluated on the tip surface 404, the first flank surface 402, the second flank surface 406, the root surface 400, or combinations thereof. According to an aspect of the disclosure, the tensile strength of the plurality of splines is evaluated on the tip surface 404.

According to an aspect of the disclosure, the material of the hub 218 and splines 322 is ductile cast iron. According to another aspect of the disclosure, the material of the hub 218 and splines 322 is ductile cast iron in accordance with the ASTM International standard ASTM A536. According to another aspect of the disclosure, the material of the hub 218 and splines 322 is ductile cast iron in accordance with the ASTM International standard ASTM A536, having a grade of 100-70-03. However, it will be appreciated that other appropriate materials are within the scope of the present disclosure.

For a given material of the hub 218 and splines 322, heat treatment, case hardening, or combinations thereof, may be applied to tailor the resulting surface tensile strength of the splines 322. According to an aspect of the disclosure, heat treatment of the splines 322 may be performed by spin hardening, where the splines 322 may be spun in front of a heat source to achieve a target surface tensile strength of the splines 322. According to another aspect of the disclosure, heat treatment of the splines 322 may be performed by a tooth-by-tooth method, where an induction heating source is placed between the flanks of adjacent spline teeth about the circumferential direction 304 to achieve a target surface tensile strength of the splines 322. Non-limiting examples of case hardening processes include nitriding, carburizing, and boronizing. However, it will be appreciated that other appropriate heat treatment or case hardening methods are within the scope of the present disclosure for tailoring the surface tensile strength of the splines 322.

INDUSTRIAL APPLICABILITY

The present disclosure is applicable to gear trains in general and, more particularly, to splines for a planet gear carrier in a planetary gear train of a final drive.

The final drive assembly 116 is subject to demanding and competing constraints with respect to strength, life, packaging size, operability, and cost. In an exemplary application of a pit mine, a mining truck may be required to operate up steep grades with maximum payloads to transport ore from a base of the mine up to the rim of the mine. The steep and continuous elevation of the work surface combined with heavy payloads in such applications can impart extreme stresses on propulsion drive trains, and impose particular challenges with respect to component life of the final drive, and operability with respect to available gear selection in light of final drive torque limitations.

The volume available for packaging a final drive is limited by the fact that the final drive is largely enclosed within the rim of a corresponding wheel. Thus, the ability to make final drive components larger to extend component life and broaden truck operability may be limited by the packaging volume available within the wheel rim, not to mention practical cost constraints. Further, application of exotic materials to increase strength and life within packaging constraints may be cost prohibitive. Moreover, dimensional distortion during heat treatment processes may impose a practical limit on the surface tensile strength achievable by hardening.

The present Applicant has identified designs for carrier splines in a final drive that are superior to conventional approaches, through application of the parameter (P) defined in Equation 3 above. These superior designs increase component life at increased loads, broaden available gear ratios during steep climbs, fit within conventional packaging and cost constraints, and are advantageously identified within critical range values of the parameter (P).

According to a first aspect of the disclosure, the superior designs correspond to a range of values for the parameter (P) between 2.5 and 6.0. Designs having values of the of the parameter (P) below 2.5 may not offer sufficient component life and gear selection operability, and designs having values of the parameter (P) above 6.0 may not fit within packaging and cost constraints.

According to a second aspect of the disclosure, advantageous designs correspond to the conditions in the first aspect described above, and the outer diameter of the splines 322 lies within a range from 250 mm to 259 mm, and a total number of spline teeth (N) ranges from 58 to 64.

According to a third aspect of the disclosure, advantageous designs correspond to the conditions in any of the first aspect or the second aspect described above, and the overall length of the plurality of splines ranges from 35 mm to 140 mm.

According to a fourth aspect of the disclosure, advantageous designs correspond to the conditions in any of the first through third aspects described above, and the surface tensile strength of the plurality of splines lies in a range from 0.6 GPa to 2.5 GPa.

According to a fifth aspect of the disclosure, advantageous designs correspond to the conditions of any of the first through fourth aspects described above, and the parameter (P) ranges from 3.0 to 5.2. Designs having values of the of the parameter (P) below 3.0 may not offer sufficient component life and gear selection operability, and designs having values of the parameter (P) above 5.2 may not fit within packaging and cost constraints.

According to a sixth aspect of the disclosure, advantageous designs correspond to the conditions of any of the first through fifth aspects described above, and the overall length of the plurality of splines ranges from 35 mm to 95 mm.

According to a seventh aspect of the disclosure, advantageous designs correspond to the conditions of any of the first through sixth aspects described above, and the surface tensile strength of the plurality of splines lies in a range from 1.0 GPa to 2.5 GPa.

According to an eighth aspect of the disclosure, advantageous designs correspond to the conditions of any of the first through seventh aspects described above, and the parameter (P) ranges from 3.2 to 4.0. Designs having values of the of the parameter (P) below 3.2 may not offer sufficient component life and gear selection operability, and designs having values of the parameter (P) above 4.0 may not fit within packaging and cost constraints.

According to a ninth aspect of the disclosure, advantageous designs correspond to the conditions of any of the first through eighth aspects described above, and the overall length of the plurality of splines ranges from 60 mm to 80 mm.

According to a tenth aspect of the disclosure, advantageous designs correspond to the conditions of any of the first through ninth aspects described above, and the surface tensile strength of the plurality of splines lies in a range from 1.0 GPa to 2.0 GPa.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Listing of features in the alternative is contemplated as providing support for disclaiming any of the alternative features by negative limitation in the claims.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A carrier for mounting a plurality of planet gears in a planetary gear train, the carrier comprising:
    a hub disposed about an axis of rotation, the hub having an external cylindrical surface including a plurality of splines extending along a longitudinal direction, the longitudinal direction being parallel to the axis of rotation; and
    a deck extending away from the hub along a radial direction, the radial direction being transverse to the longitudinal direction,
    the deck defining a plurality of holes therethrough, each hole of the plurality of holes being configured to receive an axle of a planet gear of the plurality of planet gears, the hub being disposed between the plurality of holes and the axis of rotation along the radial direction,
    the splines having a value of a parameter (P) that is not less than 2.5 and not greater than 6.0,
    the parameter (P) being defined by $$P = 1.155 \cdot T + \frac{L_s \cdot D_b \cdot \sqrt{N}}{\left[D_r + \frac{(D_o - D_r)}{3}\right]^2}$$

wherein
    T=a surface tensile strength of the plurality of splines, GPa;
    $L_s$=an overall length of the plurality of splines along the longitudinal direction, mm;
    $D_b$=a base diameter of the plurality of splines, mm;
    N=a total number of splines in the plurality of splines;
    $D_r$=a root diameter of the plurality of splines, mm; and
    $D_o$=an outside diameter of the plurality of splines, mm.

2. The carrier of claim 1, wherein the outside diameter of the plurality of splines is not less than 250 mm and not greater than 259 mm, and the total number of splines is not less than 58 and not greater than 64.

3. The carrier of claim 2, wherein the overall length of the plurality of splines is not less than 35 mm and not greater than 140 mm.

4. The carrier of claim 3, wherein the surface tensile strength of the plurality of splines is not less than 0.6 GPa and not greater than 2.5 GPa.

5. The carrier of claim 2, wherein the parameter (P) is not less than 3.0 and not greater than 5.2.

6. The carrier of claim 2, wherein the parameter (P) is not less than 3.2 and not greater than 4.0.

7. The carrier of claim 2, wherein the overall length of the plurality of splines is not less than 35 mm and not greater than 95 mm.

8. The carrier of claim 7, wherein the surface tensile strength of the plurality of splines is not less than 1.0 GPa and not greater than 2.5 GPa.

9. The carrier of claim 2, wherein the overall length of the plurality of splines is not less than 60 mm and not greater than 80 mm.

10. The carrier of claim 9, wherein the surface tensile strength of the plurality of splines is not less than 1.0 GPa and not greater than 2.0 GPa.

11. The carrier of claim 2, wherein the deck is a first deck and the plurality of holes is a first plurality of holes, and
wherein the carrier further comprises a second deck spaced apart from the first deck along the longitudinal direction, the first deck being disposed between the second deck and the hub along the longitudinal direction,
the second deck defining a second plurality of holes therethrough, each hole of the second plurality of holes facing a corresponding hole of the first plurality of holes along the longitudinal direction,
the second deck being fixed to the first deck by a webbing extending therebetween along the longitudinal direction.

12. A final drive for a truck, the final drive comprising:
a first planetary gear train including a first sun gear, a first ring gear, and a first plurality of planet gears mounted to a first carrier; and
a second planetary gear train including a second sun gear, a second ring gear, and a second plurality of planet gears mounted to a second carrier,
the first carrier including:
a hub disposed about an axis of rotation, the hub having an external cylindrical surface including a plurality of splines extending along a longitudinal direction, the longitudinal direction being parallel to the axis of rotation, the splines of the first carrier being directly coupled with internal splines of the second sun gear, such that the first carrier and the second sun gear are fixed in rotation about the axis of rotation; and
a deck extending away from the hub along a radial direction, the radial direction being transverse to the longitudinal direction, the deck defining a plurality of holes therethrough,
each planet gear of the first plurality of planet gears being mounted to a corresponding hole of the first carrier via an axle disposed through the corresponding hole, such that each planet gear of the first plurality of planet gears is free to spin relative to the first carrier about a corresponding axle,
the splines having a parameter (P) value that is not less than 2.5 and not greater than 6.0,
the parameter (P) being defined by $$P = 1.155 \cdot T + \frac{L_s \cdot D_b \cdot \sqrt{N}}{\left[D_r + \frac{(D_o - D_r)}{3}\right]^2}$$

wherein
T=a surface tensile strength of the plurality of splines, GPa;
$L_s$=an overall length of the plurality of splines along the longitudinal direction, mm;
$D_b$=a base diameter of the plurality of splines, mm;
N=a total number of splines in the plurality of splines;
$D_r$=a root diameter of the plurality of splines, mm; and
$D_o$=an outside diameter of the plurality of splines, mm.

13. The final drive of claim 12, wherein the outside diameter of the plurality of splines is not less than 250 mm and not greater than 259 mm, and the total number of splines is not less than 58 and not greater than 64.

14. The final drive of claim 13, wherein the overall length of the plurality of splines is not less than 35 mm and not greater than 95 mm.

15. The final drive of claim 14, wherein the surface tensile strength of the plurality of splines is not less than 1.0 GPa and not greater than 2.5 GPa.

16. The final drive of claim 15, further comprising a spindle, wherein the first ring gear and the second ring gear are mechanically grounded to the spindle.

17. The final drive of claim 16, further comprising an input shaft and an output hub,
wherein the first sun gear is directly coupled to the input shaft of the final drive, such that the first sun gear and the input shaft are fixed in rotation about the axis of rotation, and
wherein the second carrier is directly coupled to the output hub, such that the second carrier and the output hub are fixed in rotation about the axis of rotation.

18. The final drive of claim 13, wherein the overall length of the plurality of splines is not less than 60 mm and not greater than 80 mm.

19. The final drive of claim 18, wherein the surface tensile strength of the plurality of splines is not less than 1.0 GPa and not greater than 2.0 GPa.

20. A mining truck, comprising:
a frame; and
a propulsion drive train coupled to the frame, the propulsion drive train including a prime mover operatively coupled to a propulsion wheel via a final drive for transmission of mechanical shaft power therebetween, the final drive comprising
a first planetary gear train operatively coupled to the prime mover via a drive shaft, the first planetary gear train including a first sun gear, a first ring gear, and a first plurality of planet gears mounted to a first carrier; and
a second planetary gear train including a second sun gear, a second ring gear, and a second plurality of planet gears mounted to a second carrier, the propulsion wheel being fixed in rotation to an output component of the second planetary gear train,
the first carrier including:
a hub disposed about an axis of rotation, the hub having an external cylindrical surface including a plurality of splines extending along a longitudinal direction, the longitudinal direction being parallel to the axis of rotation, the splines of the first carrier being directly coupled with internal splines of the second sun gear, such that the first carrier and the second sun gear are fixed in rotation about the axis of rotation; and
a deck extending away from the hub along a radial direction, the radial direction being transverse to the longitudinal direction, the deck defining a plurality of holes therethrough,
each planet gear of the first plurality of planet gears being mounted to a corresponding hole of the first carrier via an axle disposed through the corresponding hole, such that each planet gear of the first plurality of planet gears is free to spin relative to the first carrier about a corresponding axle,
the splines having a parameter (P) value that is not less than 3.0 and not greater than 5.2,
the parameter (P) being defined by $$P = 1.155 \cdot T + \frac{L_s \cdot D_b \cdot \sqrt{N}}{\left[D_r + \frac{(D_o - D_r)}{3}\right]^2}$$

wherein
- $T$ = a surface tensile strength of the plurality of splines, GPa;
- $L_s$ = an overall length of the plurality of splines along the longitudinal direction, mm;
- $D_b$ = a base diameter of the plurality of splines, mm;
- $N$ = a total number of splines in the plurality of splines;
- $D_r$ = a root diameter of the plurality of splines, mm; and
- $D_o$ = an outside diameter of the plurality of splines, mm, and wherein the outside diameter of the plurality of splines is not less than 250 mm and not greater than 259 mm, and the total number of splines is not less than 58 and not greater than 64.

\* \* \* \* \*